United States Patent Office 2,782,582
Patented Feb. 26, 1957

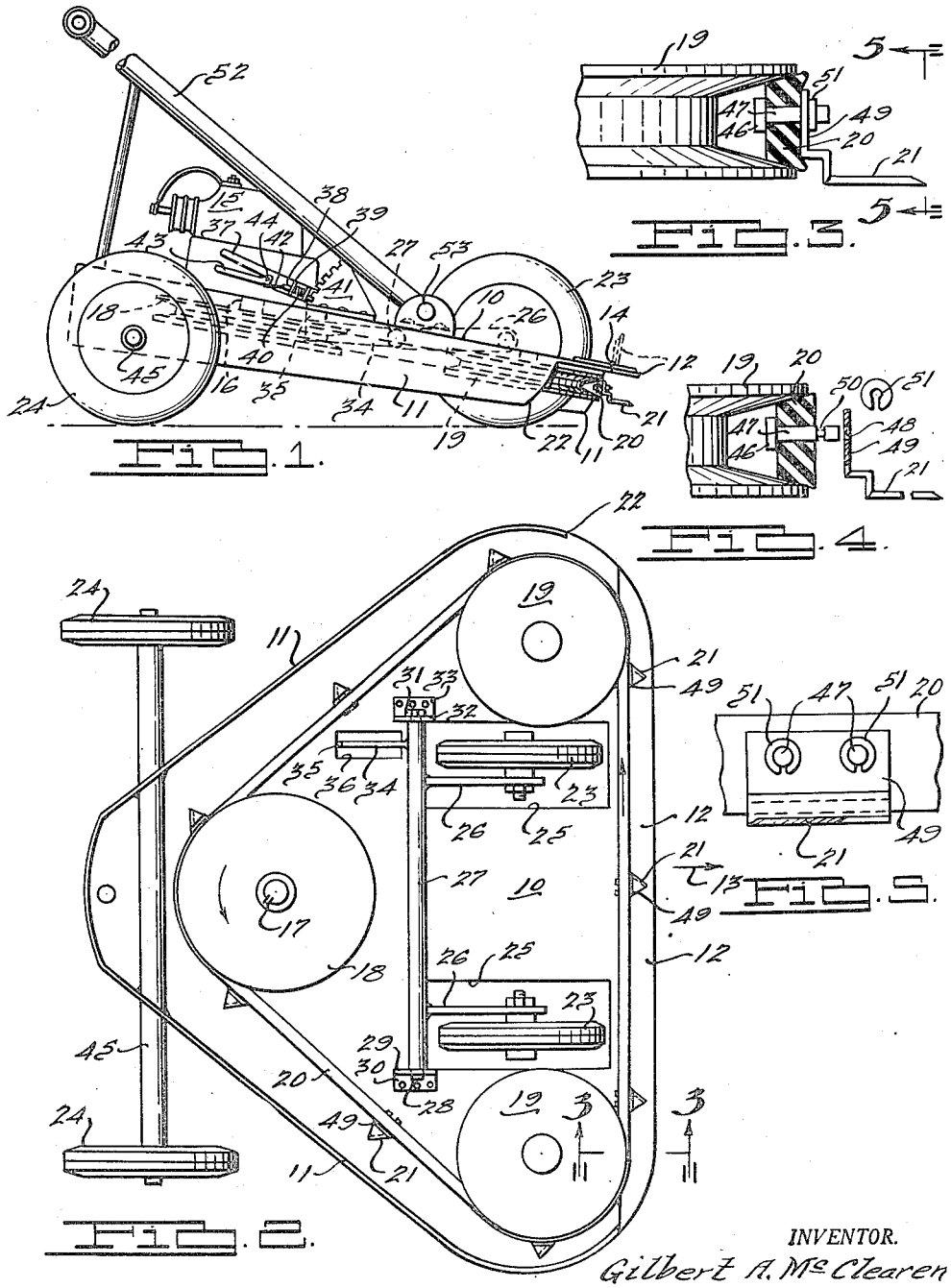

2,782,582

POWER MOWER WITH ENDLESS BELT CUTTING MEANS

Gilbert A. McClearen, Wyandotte, Mich., assignor to Jay C. Taylor, Detroit, Mich., as Trustee Application September 5, 1952, Serial No. 307,950

2 Claims. (Cl. 56—25)

This invention relates to improvements in a lawnmower or grass cutter, particularly of the type comprising a number of cutting blades carried by a continuous power driven belt.

An important object of the present invention is to provide an improved power operated lawn mowing machine of the foregoing character which is simple, efficient, and economical in construction and operation and characterized by a chassis of low silhouette supported on ground engaging rollers and carrying forwardly located cutting means, all arranged in an improved manner with respect to each other to facilitate maneuverability of the mower around and under low shrubs and trees and closely to borders of the lawn, as for example adjacent gardens, trees, fences, buildings and the like, thereby to accomplish both mowing and trimming of the lawn in a single operation with the same machine without recourse to the use of auxiliary parts or equipment.

Another and more specific object of the present invention is to provide such a power mower comprising a chassis having a generally flat triangular top, one edge of the triangular top comprising a transverse forward or leading edge and the other two edges comprising rearwardly converging lateral edges. An upright drive shaft extending through the top adjacent the rear thereof is keyed to a rear drive pulley mounted below the top and is connected with a motor to be rotated thereby located above the top directly over the rear pulley. A pair of laterally spaced driven pulleys are mounted below the top adjacent and rearwardly of the opposite ends of the transverse leading edge, the three pulleys being arranged in a plane parallel to the top to support a blade carrying belt entrained therearound in a generally triangular loop comparable to the triangular shape of the top, the forward portion of the loop extending parallel to and adjacent the leading edge of the chassis top and comprising the cutting portion of the mower when the belt is driven at high speed around the pulleys by operation of the motor.

A problem heretofore in the construction of power lawnmowers employing a blade carrying belt has been the proper placement of roller supports which would adequately support the forward portions of the chassis, yet which would not interfere with and depress uncut grass in advance of the mower nor extend laterally of the cutting means and interfere with the trimming of borders. This problem has been met in the present invention by reason of the improved arrangement of the blade carrying belt in a generally horizontal closed loop extending rearward from a transverse forward portion. Thus in accordance with the present invention, forward ground engaging roller means are located within the loop between the laterally spaced pulleys and immediately rearward of the transverse forward portion of the belt to support the forward portions of the chassis. The rear of the latter is suitably supported by rear roller means which may be rearward of the loop. Accordingly during operation of the mower, both roller means roll on lawn after it is cut. Furthermore the swath cut by the mower extends laterally of the forward roller means by at least the diameter of the lateral pulleys, so that trimming completely to an edge of a lawn bordered by a depressed garden or a fence or the like is readily permitted while the roller means ride on the lawn inside the border.

Another object is to provide a lawnmower of the foregoing character which is readily adjusted for cutting height merely by adjusting the height of the front roller means with respect to the chassis and wherein the plane of the loop of the blade carrying belt inclines slightly rearwardly at normal positions of adjustment so as to rise above the lawn clippings and to avoid carrying the latter rearward into the operating mechanism, as for example a forward drive mechanism where such is provided.

Other objects of this invention will appear in the following description and appended claims, reference being had to the accompanying drawings forming a part of this specification wherein like reference characters designate corresponding parts in the several views.

Fig. 1 is a fragmentary side view, with parts broken away and shown in section showing a lawnmower embodying the present invention.

Fig. 2 is a view showing the underside of the chassis and cutting mechanism illustrated in Fig. 1.

Fig. 3 is a fragmentary enlarged section taken in the direction of the arrows substantially along the line 3—3 of Fig. 2, but top side up.

Fig. 4 is a view similar to Fig. 3, showing one of the blades and fasteners prior to their assembly.

Fig. 5 is a fragmentary view taken in the direction of the arrows along the line 5—5 of Fig. 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example comprising a frame or chassis having a generally triangular plane top 10 and depending lateral guard flanges 11 along the converging lateral edges of the top. A forward flap 12 comprising the leading edge of the top 10 extends transversely of the direction of travel indicated by the arrow 13 and is hinged at 14 to swing upward through a right angle, Fig. 1, to adapt the mower for cutting tall grass or weeds as described below. Mounted on the triangular top 10 adjacent the rear apex thereof is a motor 15 which powers a rotatable drive shaft 16. The latter extends perpendicularly through the top 10 and is keyed at 17 to a grooved rear drive pulley 18 adjacent the underside of the top 10. A pair of grooved driven pulleys 19 are supported by the top 10 below the same and adjacent its lateral forward apices. The pulleys 18 and 19 are arranged to rotate in a common plane parallel to the top 10 and support a V-type pulley belt 20 having a plurality of cutting blades 21 detachably secured thereto and projecting outwardly therefrom.

In accordance with the structure described thus far, an efficient compact mower assembly is feasible wherein the belt 20 extends in a generally triangular closed loop entrained around the pulleys and conforming substantially to the contour of the top 10 and spaced inward from the guard flanges 11 which shield the blades 21 at the sides and rear of the chassis. The belt 20 has a forward portion which extends transversely of the direction of travel and parallel to the overlying flap 12. The latter extends forward slightly beyond the outer or forward edges of the blades 21 to comprise a guard for the same. The flanges 11 terminate forwardly at the flap 12 so as to expose the blades 21 for cutting action upon high speed counterclockwise rotation of the belt 20, Fig. 2. Since the movement of the belt 20 and blades 21 sets up strong air currents tending to blow newly cut grass clippings to the right side of the mower, the forward portion of the flange 11 at the right side of the chassis is cut away at 22 to provide a discharge opening for clipping.

By virtue of the improved construction and arrangement shown, wherein the belt 20 extends parallel to the underside of the chassis top 10, a low silhouette is achieved particularly at the forward portion of the mower to facilitate maneuvering under and around low trees and shrubs. The motor 15 is feasibly located at the rear of the chassis, rather than over the cutting portion of the belt 20 as is ordinarily necessary with conventional mowers having horizontally rotating cutting blades. In addition, it is to be noted that the span of the forward portion of the belt 20 between the pulleys 19 may feasibly range from less than sixteen inches to more than forty inches for example without increasing the centrifugal forces on the belt.

The chassis is supported by front and rear ground engaging wheels or rollers 23 and 24 respectively. The front rollers comprise a pair of wheels spaced transversely between the pulleys 19 immediately rearward of the belt 20, so as to support the mower adjacent the latter's forward cutting edge, and located within wells or openings 25 in the top 10. The wheels 23 are journaled on the forward ends of vertically swinging bracket arms 26 respectively, which in turn are welded to and extend forward from a horizontal transverse pivotal shaft 27. A reduced end portion 28 at one end of the shaft 27 is pivotally supported by a depending flange 29 of a bracket 30 secured to the underside of the top 10. A large headed bolt 31 screwed coaxially into the other end of the shaft 27 extends outward to its head through a depending flange 32 of a bracket 33 secured to the underside of the top. Thus the shaft 27 is pivotal about its horizontal transverse axis to swing the wheels 23 vertically, thereby to adjust the cutting height of the blades 21 at the forward transverse portion of the belt loop.

Adjustment of the pivotal position of the shaft 27 is accomplished by an arm 34 welded to the shaft 27 and extending rearward therefrom. A rear portion of the arm 34 extends upward at 35 through an opening 36 in the top 10 and terminates at its upper end in a rearwardly inclined hand grip lever 37. An axially slidable detent bolt 38 parallel to the lever 37 extends slidably through a pair of spaced lugs 39 secured to and projecting laterally from the lever 37. Intermediate the lugs 39 is a spring 40 coiled around the bolt 38 and secured thereto under compression tending to urge the bolt 38 axially forward into detent engagement with the radial teeth of a gear sector 41 coaxial with the shaft 27 and secured to the top 10. The bolt 38 is retracted from engagement with the gear sector 41 and against the pressure of the spring 40 by means of a flexible coupling 42 connecting the rear end of the bolt 38 with a pivotal hand lever 43 underlying the lever 37. The lever 43 is pivotally connected to the lever 37 at 44 immediately above the connection between the coupling 42 and lever 43 and ordinarily diverges from the lever 37, whereby upon the application of hand pressure to squeeze the levers 37 and 43 together, the coupling 42 and bolt 38 are pulled rearward and the latter is withdrawn from the gear 41. It is thus possible to swing the lever 37 upward, pivoting the shaft 27 clockwise in Fig. 1 and lowering the wheels 23 with respect to the chassis. Thereafter upon release of the lever 43, the bolt 38 is urged forward and can be located between a pair of adjacent teeth of the gear 41 to lock the chassis in adjusted position.

The rear rollers or wheels 24 are journaled on the opposite ends of a transverse axle shaft 45 which pierces the side flanges 11 rearward of the pulley 18. It is to be noted in Fig. 1 that the chassis and cutting portions of the belt 20 are shown at their lowest positions of adjustment and the planes of the top 10 and belt loop are inclined rearwardly. As the wheels 23 are lowered and the cutting edge of the belt 20 is swung upward about the axis of the shaft 45, the incline of the top 10 and plane of the belt loop tends to decrease. The structure is designed so that when the transverse cutting portion of the belt 20 is raised to the most frequently employed grass cutting position, the top 10 and plane of the belt loop will be substantially horizontal. However, a slight rearward incline for the belt 20 is ordinarily preferred in most situations so that clippings will fall below the blades 21 and not be carried rearward along the right side of the belt loop.

Referring to Figs. 3 and 4, the circumferential portions of the pulleys are deeply grooved so as to provide a space between the inner side or portion of the belt and pulley for the enlarged head 46 of a blade retaining pin 47. A pair of such pins 47 are associated with each blade 21 and extend outwardly through the belt 20 and through a pair of holes 48 in an upright inner bracket for body portion 49 of the associated blade 21 and adjacent the outer surface of the belt 20. Each pin 47 is provided with a reduced neck portion 50 adjacent the bracket portion 49 and is retained by a resilient C-ring 51 interfitting on the neck portion 50 tightly against the bracket portion 49. The belt 20 is of resilient flexible material under compression between the pin heads 46 and bracket portions 49. The central portion of the opening of each C-ring fits closely around the associated neck portion 50, the radial opening of the C-ring being undersize with respect to the neck portion 50 to prevent accidental displacement therefrom.

In order to replace a worn blade, it is merely necessary to compress the belt 20 between the bracket portion 49 and heads 46 of the associated pins 47, thereby to release the pressure directed axially against the C-rings. Each C-ring is then sprung off its respective neck portion, whereupon the bracket portions 49 are removable from the pins 47.

After starting the motor 15, the mower is propelled manually by pushing on the handle shaft 52 having a forked lower end connected at 53 to the chassis. The blades 21 traveling from left to right transversely across the path of movement 13 cleanly cut the grass in said path. By virtue of the wheels 23 located within the loop of the belt 20, and adjacent the forward transverse portion thereof, the forward portion of the chassis is adequately supported and the cutting action extends laterally of the wheels 23. This latter feature permits trimming feasibly within a quarter of an inch of a wall, for example, and also permits the wheels to roll along an elevated lawn adjacent the edge thereof with the cutting action extending completely to the edge and even overlapping the same. Thus trimming and mowing are accomplished in a single operation by the construction and arrangement of parts disclosed. Where unusually tall grass or weeds are encountered, the flap 12 is raised to the vertical position, dotted lines, Fig. 1, so as to avoid interference with the cutting operation. Otherwise the mowing is efficiency accomplished with the flap 12 down, as shown by the solid line, Fig. 1.

I claim:

1. In a lawnmower, a frame having a generally horizontal leading edge, a pulley belt arranged in a closed loop having a forward portion generally parallel to, below, and rearward of said leading edge, a plurality of blades spaced along said belt and secured thereto and extending outwardly therefrom, said leading edge extending forward of the forward ends of said blades at the forward portion of said loop to comprise a guard, a pair of transversely spaced pulleys journaled on said frame and located below and adjacent the opposite ends respectively of said leading edge, a rear pulley journaled on said frame rearwardly of the first-named pulleys, said belt extending around the three pulleys in driving relation and the forward portion of said loop spanning said transversely spaced pulleys, a motor having a rotating drive shaft and mounted on said frame directly above said rear pulley, said shaft being coaxial with said rear pulley and keyed thereto to rotate the same, forward ground engaging means within said loop and carried by said frame, and rear ground engaging means carried by said frame rearwardly of the first-named ground engaging means.

2. In a lawnmower, a frame having a generally horizontal leading edge, a pulley belt arranged in a closed loop having a forward portion generally parallel to, below, and rearward of said leading edge, a plurality of blades spaced along said belt and secured thereto and extending outwardly therefrom, said leading edge extending forward of the forward ends of said blades at the forward portion of said loop to comprise a guard, a rear pulley and a pair of transversely spaced forward pulleys journaled on said frame, said forward pulleys being located below and adjacent the opposite ends respectively of said leading edge, said belt extending around the three pulleys in driving relation and the forward portion of said loop spanning said transversely spaced pulleys, a motor mounted on said frame, means drivingly connecting said motor to said belt, and ground engaging means carried by said frame to support the same.

References Cited in the file of this patent

UNITED STATES PATENTS

| | | |
|---|---|---|
| 289,144 | Rumrill | Nov. 27, 1883 |
| 396,038 | Hall | Jan. 8, 1889 |
| 571,904 | Lankford | Nov. 24, 1896 |
| 765,126 | Chaplin | July 12, 1904 |
| 1,344,624 | Ellis | June 29, 1920 |
| 1,907,506 | Coburn | May 9, 1933 |
| 1,911,447 | Heuer | May 30, 1933 |
| 2,497,573 | Apple | Feb. 14, 1950 |
| 2,511,124 | Phelps | June 13, 1950 |
| 2,514,861 | Hackerott | July 11, 1950 |
| 2,543,386 | Templeton | Feb. 27, 1951 |